United States Patent
Frenkel

(10) Patent No.: US 6,424,766 B1
(45) Date of Patent: Jul. 23, 2002

(54) DEVICE FOR OPTIMIZING SIGNAL CHANNELLING IN COMMUNICATION SYSTEMS

(75) Inventor: Ferdinand Frenkel, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/509,398

(22) PCT Filed: Nov. 11, 1998

(86) PCT No.: PCT/DE98/03309

§ 371 (c)(1),
(2), (4) Date: Mar. 27, 2000

(87) PCT Pub. No.: WO99/27402

PCT Pub. Date: Jan. 3, 1999

(30) Foreign Application Priority Data

Nov. 20, 1997 (DE) .......................................... 197 51 557

(51) Int. Cl.⁷ .................................................. G02B 6/26
(52) U.S. Cl. .............................. 385/48; 385/24; 385/45
(58) Field of Search ............................... 385/15–24, 31, 385/39, 42, 43, 44, 45, 46, 48

(56) References Cited

U.S. PATENT DOCUMENTS

| 4,514,057 A | 4/1985 | Palmer et al. | |
|---|---|---|---|
| 5,311,604 A | * 5/1994 | Rogner et al. | 385/14 |
| 5,559,914 A | * 9/1996 | Asakura | 385/49 |
| 5,732,173 A | * 3/1998 | Bylander et al. | 385/49 |

FOREIGN PATENT DOCUMENTS

| DE | 43 07 155 | 8/1994 |
|---|---|---|
| DE | 94 14 685 | 3/1996 |
| EP | 0 472 899 | 4/1992 |
| EP | 0 560 043 | 9/1993 |
| EP | 0 668 515 | 8/1995 |
| EP | 0 350 900 | 1/1996 |
| JP | 5-100121 | 4/1993 |

* cited by examiner

*Primary Examiner*—Akm E. Ullah
*Assistant Examiner*—Michelle R. Connelly-Cushwa
(74) *Attorney, Agent, or Firm*—Schiff Hardin & Waite

(57) ABSTRACT

In order to be able to supply information signals to a number of internal system devices via light waveguides in contemporary communication systems, optical power dividers are employed. These are designed such that an optical fiber brought in at the input side is divided onto a plurality of optical fibers. In order to achieve an ordering given the plurality of light waveguides, the divided optical fibers are combined to form groups such that each group comprises a same structure as the fibers arranged at the input side.

7 Claims, 1 Drawing Sheet

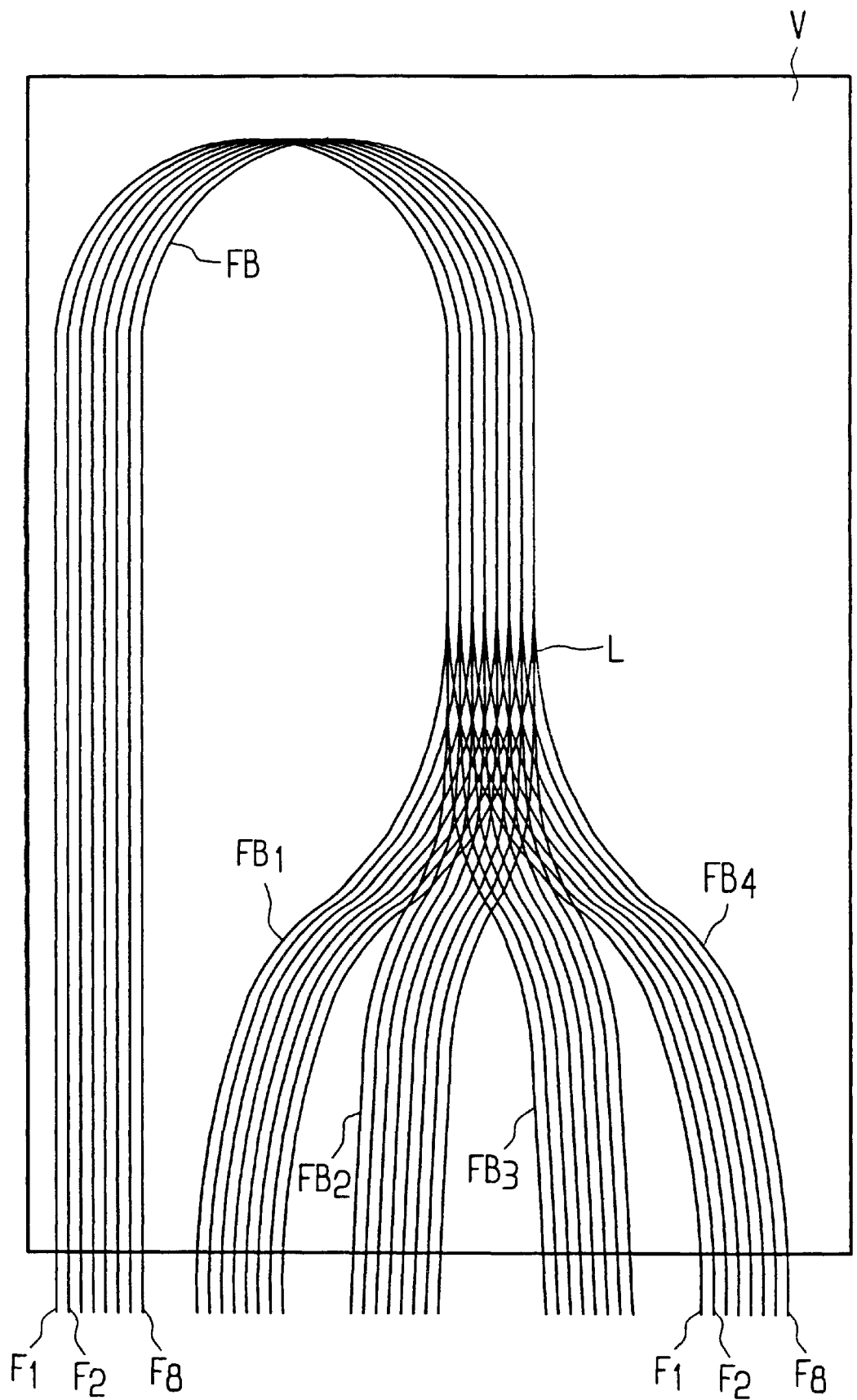

DEVICE FOR OPTIMIZING SIGNAL CHANNELLING IN COMMUNICATION SYSTEMS

BACKGROUND OF THE INVENTION

The invention is directed to an apparatus for optimized signal feed in communication systems.

There is the problem in contemporary communication systems of feeding the information signals to be processed to a plurality of internal system devices. This is especially true of the switching network assemblies of an ATM communication system that are arranged in close spatial proximity.

Since transmission rates of 3.3 Gbit/s can no longer be efficiently conducted via electrical lines, the feed of the information signals is realized via light waveguides. The latter are usually designed as optical (glass) fibers.

Optical power dividers are employed in the prior art in order to be able to efficiently feed the information signals to the plurality of internal system devices. These are designed such that one optical fiber is brought to the input side. A plurality of optical fibers leave the power divider at the output side. The information signals are thus supplied to the power divider via the fiber of the input side and are divided therein into a plurality of identically designed information signals. Each of the information signals divided in this way leaves the optical power divider via the fibers of the output side and is supplied to the following devices that come into consideration. An information signal can thus be simultaneously supplied to a plurality of devices.

For example, 1×4 branchers are employed as optical power dividers in the prior art. This means that the optical power divider comprises one optical fiber arranged at the input side and a total of four optical fibers arranged at the output side. Further, 1×2, 1×8 or 1×16 branchers are employed in the prior art.

The use of these optical branchers harbors the problem that the user-friendliness is lost due to the plurality of internal system devices in a tight space. Particularly when expanding the communication system with further assemblies, there is then the risk that optical fibers will be mixed up and incorrectly connected.

European Patent Application EP 0 350 900 A2 discloses a method for fabricating optical branchers. However, how the guidance of optical fibers should occur in a communication system is not addressed anywhere therein.

United States Letters Patent U.S. Pat. No. 4,514,057 likewise discloses a method and an apparatus for the fabrication of optical branchers. However, how the guidance of optical fibers should occur in a communication system is also not addressed anywhere therein.

SUMMARY OF THE INVENTION

The object of the invention is to disclose an apparatus with which the guidance of optical fibers in a communication system can be implemented in a practical way.

According to the invention, an apparatus is provided for optimized signal feed in communication systems. A plurality of optical power dividers are provided to which optical fibers comprising a predetermined structure are supplied at an input side. The structure is established by the nature of the arrangement of the optical fibers relative to one another. The plurality of optical power dividers respectively divide each of the optical fibers into a plurality of M optical fibers where M is greater than 2. The divided optical fibers are combined into groups at the output side such that each group comprises a respective same structure as the fibers arranged at the input side.

What is especially advantageous in the invention is that the optical fibers are combined into groups at the output of the power divider, and that each group comprises the respectively same structure as the fibers brought in at the input side. A sorting of the fibers is thus achieved. The sorting result is thus handed over to the following devices.

The invention is explained in greater detail below on the basis of an exemplary embodiment shown in the the drawing FIGURE.

BRIEF DESCRIPTION OF THE DRAWING

The drawing FIGURE shows a branch or cassette having a plurality of optical power dividers arranged according to the present invention.

In accordance therewith, the overall set of optical power dividers required in the communication system is divided into set units, whereby these set units are accommodated in a brancher cassette V. The brancher cassette V is shown in the drawing FIGURE.

Eight optical power dividers L are arranged in the brancher cassette V. According to the present exemplary embodiment, eight optical fibers F1 . . . F8 are to be conducted to the optical power dividers L. The feed should preferably occur individually, even though the combining of the optical fibers in a fiber ribbon is likewise possible. The individual optical fibers are brought in from the individual internal devices of the communication system. Due to the type of connection of the optical fibers F1 . . . F8, the way in which the optical fibers of the input side are spatially supplied to the power dividers is then determined here. According to the present exemplary embodiment, this should occur such for the purpose of a structure that the fiber F2 is arranged next to the fiber F1, etc. A specific spatial structure, is thus then established.

Each of the optical fibers F1 . . . F8 is divided into 4 further optical fibers in the power dividers L. This means that, for example, the fiber F1 is divided into for further optical fibers F1. The same is true for the optical fibers F2 . . . F8. Overall, thus, 4×8=32 optical fibers leave the power dividers L and the brancher housing V at the output side.

According to the invention, the optical fibers are then classified into groups at the output side. This ensues such that a first group FB1 is formed with optical fibers F1 . . . F8 that receive information signals from the optical fibers F1 . . . F8 arranged at the input side. The same is true of the further groups FB2, FB3, FB4. A sorting is thus achieved. The optical fiber F3 of the group FB1 is thus arranged next to the optical fibers F2, F4 at the output side in the same way that already occurred at the input side. At the output side, the fiber F3 therefore also carries the same information as the fiber F3 at the input. The optical fibers of the other groups are sorted in the same way. The number of power dividers L in the brancher housing V is thus defined by the number of groups.

Advantageously, the optical fibers arranged at the output side are combined in the form of fiber ribbons. In the same way, the fibers brought in at the input side can be combined to form a fiber ribbon. Practical considerations, however, favor the introduction of individual fibers.

Although various minor changes and modifications might be proposed by those skilled in the art, it will be understood that my wish is to include within the claims of the patent warranted hereon all such changes and modifications as reasonably come within my contribution to the art.

What is claimed is:

1. An apparatus for optimized signal feed in communication systems, comprising:
    an input side having a plurality of optical fibers comprising a predetermined structure, said structure being established by a nature of an arrangement of said optical fibers relative to one another;
    a plurality of optical power dividers to which said plurality of optical fibers are fed at an input side;
    each one of the plurality of optical power dividers respectively dividing each of the optical fibers into a plurality of M optical fibers where M is greater than 2; and
    the divided optical fibers are combined into groups at an output side of the power dividers such that each group comprises a respective same predetermined structure as the optical fibers arranged at the input side.

2. The apparatus according to claim 1 wherein the groups are designed in the form of a fiber ribbon comprising the plurality of optical fibers.

3. The apparatus according to claim 1 wherein the plurality of optical fibers conducted to the optical power dividers at the input side are brought in as individual fibers.

4. The apparatus according to claim 1 wherein the plurality of optical fibers conducted to the optical power divider at the input side are brought in as a fiber ribbon.

5. The apparatus according to claim 1 wherein the optical power dividers, the optical fibers, as well as at least one fiber ribbon are integrated in a brancher cassette.

6. The apparatus according to claim 1 wherein said predetermined structure comprises a positioning of the optical fibers in a predetermined sequence in a row next to each other and wherein said same sequence is maintained in each of said groups.

7. An apparatus for optimized signal feed in communication systems, comprising:
    an input side having a plurality of optical fibers arranged in a row in a predetermined order;
    a plurality of optical power dividers to which said plurality of optical fibers are fed at an input side;
    each one of the plurality of optical power dividers respectively dividing each of the optical fibers into a plurality of M optical fibers where M is greater than 2; and
    the divided optical fibers are combined into groups at an output side of the power dividers such that each group comprises a respective row of the same predetermined order as the optical fibers arranged at the input side.

* * * * *